(12) United States Patent
Takanashi et al.

(10) Patent No.: US 6,373,218 B2
(45) Date of Patent: Apr. 16, 2002

(54) ELECTRIC HAND WITH TORQUE LIMITER

(75) Inventors: Seiji Takanashi; Hiroshi Miyachi; Kouichiro Kanda, all of Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/768,606

(22) Filed: Jan. 25, 2001

(30) Foreign Application Priority Data

Feb. 25, 2000 (JP) ........................................ 2000-049276

(51) Int. Cl.[7] .............................................. G05B 19/04
(52) U.S. Cl. .......................... 318/568.21; 318/568.12; 388/930
(58) Field of Search ................... 318/568.11, 568.12, 318/568.21; 388/930, 937

(56) References Cited

U.S. PATENT DOCUMENTS

| | | | | |
|---|---|---|---|---|
| 1,807,360 A | * | 5/1931 | Wehr ........................... | 294/106 |
| 2,226,789 A | * | 12/1940 | Tupy ........................... | 294/106 |
| 3,103,282 A | * | 9/1963 | York ........................... | 212/128 |
| 3,670,620 A | * | 6/1972 | Paraskewik ................. | 89/1.5 B |
| 4,360,110 A | * | 11/1982 | Sigman et al. .............. | 212/159 |
| 4,955,653 A | | 9/1990 | Beals ....................... | 294/119.1 |
| 5,200,679 A | * | 4/1993 | Graham ................. | 318/568.16 |
| 5,323,674 A | * | 6/1994 | Fidkowski ................... | 81/487 |
| 5,661,909 A | * | 9/1997 | Kondo et al. .................. | 30/392 |
| 5,682,802 A | * | 11/1997 | Mazzone ..................... | 81/127 |

FOREIGN PATENT DOCUMENTS

| | | |
|---|---|---|
| EP | 0 241 878 | 10/1987 |
| JP | 4-135194 | 5/1992 |
| JP | 2000-233391 | 8/2000 |

* cited by examiner

*Primary Examiner*—Robert E. Nappi
*Assistant Examiner*—Rina I. Duda
(74) *Attorney, Agent, or Firm*—Oblon, Spivak, McClelland, Maier & Neustadt, P.C.

(57) ABSTRACT

In an electric hand, a cam member 12 mounted to a drive shaft 3a of an electric motor 3 is provided with a pair of cam grooves 15 and 15, a pair of jaw members 2 and 2 for grasping a workpiece are provided with drive pins 13 fitted to the cam grooves 15 and 15, and a normal or reverse rotation motion of the drive shaft 3a is converted into an opening or closing motion of the jaw members 2 and 2 by the cam member 12 and the drive pins 13. A torque limiter 6 having a friction plate 19 for connecting by a frictional force the drive shaft 3a of the electric motor 3 and the cam member 12 is provided between the drive shaft 3a and the cam member 12, and a torque of the drive shaft 3a transmitted to the cam member 12 is limited by this torque limiter 6.

4 Claims, 3 Drawing Sheets

ELECTRIC HAND WITH TORQUE LIMITER

TECHNICAL FIELD

The present invention relates to an electric hand having a pair of workpiece-grasping jaw members which are opened and closed by an electric motor, and more particularly, to an electric hand with a torque limiter in which no impact is applied to a motor drive shaft when the jaw members are stopped at an opening or closing end or a workpiece-grasping position.

PRIOR ART

In generally, in a hand for grasping a workpiece between a pair of jaw members which can be opened and closed, the jaw members are opened and closed by an air cylinder.

However, a conventional hand of such a structure requires an air piping with respect to the air cylinder and additional devices such as a direction-switching valve for controlling the supply and discharge of compressed air to the piping, and the number of parts constituting the hand itself is increased. For this reason, it is difficult to make the hand compact, and to make the entire apparatus including the additional devices for operating the hand compact.

To solve such a problem, the present inventors proposed an electric hand for opening and closing a pair of workpiece-grasping jaw members using an electric motor (Japanese Patent Application No. 11-66528). In this electric hand, a conversion mechanism using a cam is provided between a drive shaft of the electric motor and the jaw members for converting a normal-reverse rotational motion of the drive shaft into an opening and closing motion of the jaw members.

In such an electric hand, when a workpiece-grasping force by the jaw members is increased, a motor with a speed reducer having a plurality of gears is used as an electric motor. When such a motor with gears is used, however, since an inertial force due to a rotor of the motor is applied when the jaw members stop at the opening and closing end or the workpiece-grasping position and the gears of the speed reducer are damaged by the impact, the motor must be rotated as slow as possible.

DISCLOSURE OF THE INVENTION

In an electric hand for opening and closing a workpiece-grasping jaw members using a motor, it is an technical object of the present invention to absorb an inertial force applied to a motor drive shaft when the jaw members stop at an opening or closing end or a workpiece-grasping position, thereby preventing a motor part such as a gear from being damaged by the impact.

To achieve the above object, the present invention provides an electric hand comprising: a pair of jaw members which can be opened and closed for grasping a workpiece; an electric motor having a rotating drive shaft; a converter mechanism provided between the drive shaft and the jaw members for converting a normal or reverse rotation motion of the drive shaft into an opening and closing motion of the pair of jaw members, the converter mechanism having a cam member which is normally or reversely rotated by the drive shaft, a pair of cam grooves formed in the cam member, and drive pins respectively mounted to the jaw members and fitted to the pair of cam grooves, the drive pins are displaced in the cam groove by a normal or reverse rotation of the cam member in an opening or closing direction of the jaw members; and a torque limiter provided between the drive shaft of the electric motor and the cam member for limiting a torque of the drive shaft transmitted to the cam member.

The electric hand of the invention having the above structure, since a torque transmitted from the drive shaft of the electric motor to the cam member is limited by the torque limiter, it is possible to absorb an inertial force of a rotor of the motor applied to a motor drive shaft when the jaw members stop at an opening or closing end or a workpiece-grasping position, thereby reliably preventing a motor part such as a gear from being damaged by the impact.

According to a concrete embodiment of the invention, the torque limiter includes friction means for connecting the drive shaft and the cam member by a frictional force. The friction means includes a disc-like hub fixed to the drive shaft, a friction plate fixed to one of the hub and the cam member and abutted against the other in a friction state, and spring means for biasing the friction plate in a direction abutting against the hub or the cam member. More specifically, the cam member is of circular cup-like shape, the hub is coaxially fitted into the cam member, the friction plate is of an annular shape, an outer periphery of the friction plate is fixed to an annular mounting face of the cam member surrounding the hub, an inner periphery of the friction plate abuts against the hub, the spring means comprises a Belleville spring, the Belleville spring is interposed between a spring seat mounted to the drive shaft and the friction plate.

DETAILED DESCRIPTION

Figure 1:
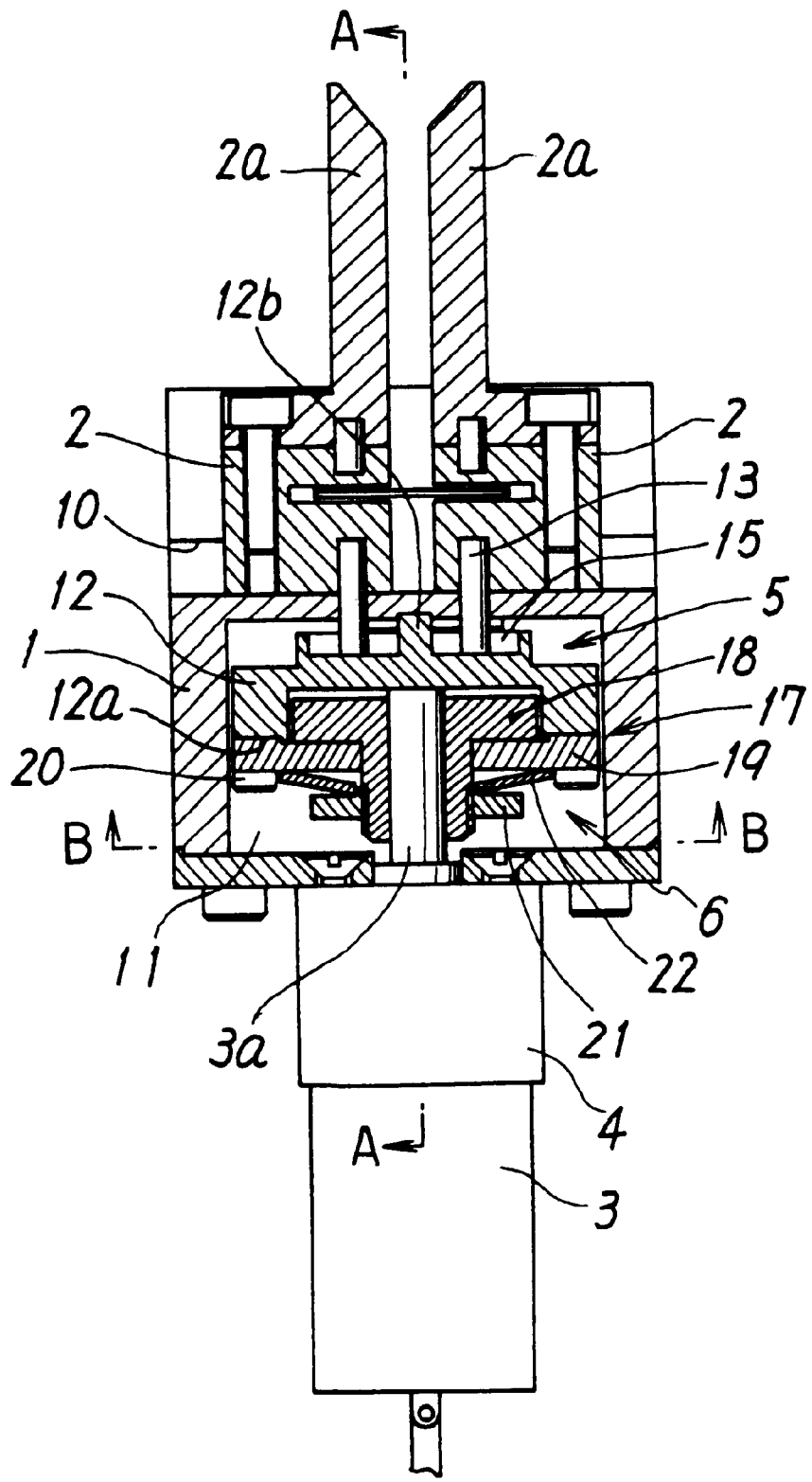
FIG. 1 is a sectional view showing an embodiment of an electric hand according to the present invention.
Figure 2:
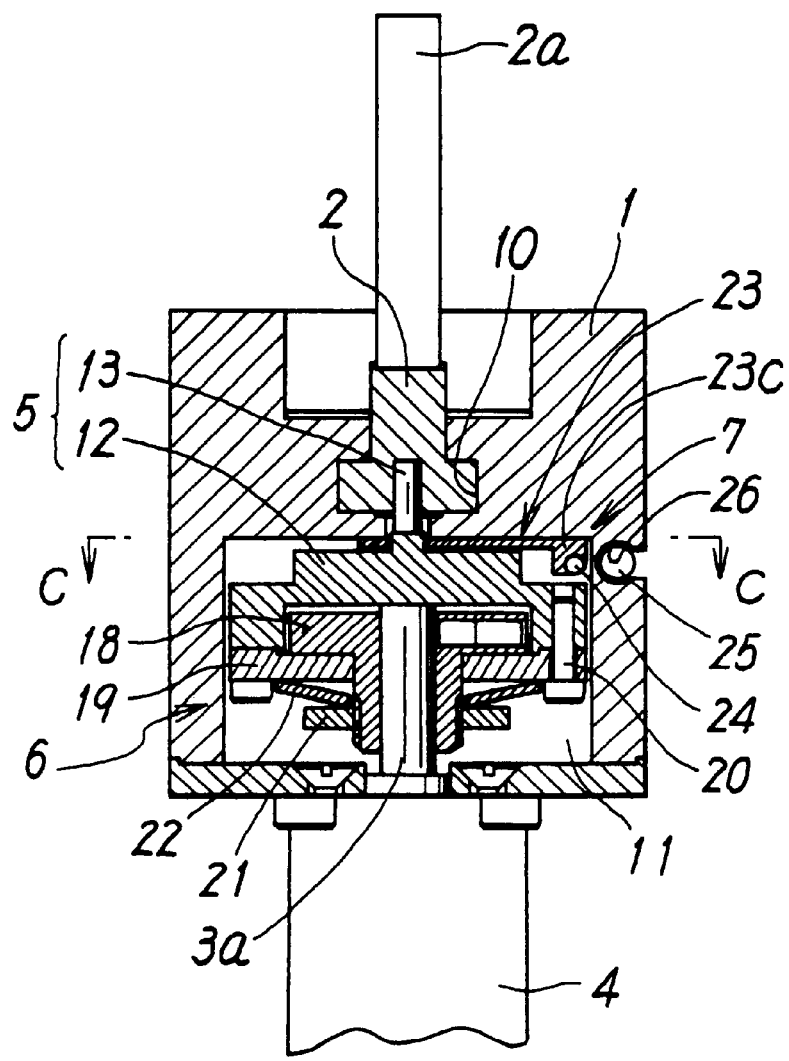
FIG. 2 is a sectional view taken along a line II-II in FIG. 1.

The drawings show a representative embodiment of an electric hand according to the present invention. As shown in FIGS. 1 and 2, this electric hand comprises a pair of opening/closing jaw members 2 and 2 for grasping a workpiece, an electric motor 3 having a speed reducer 4, a converter mechanism 5 for converting a normal/reverse rotational motion of a drive shaft 3a of the electric motor 3 into an opening/closing motion of the jaw members 2 and 2, a torque limiter 6 provided between the drive shaft 3a and the converter mechanism 5 for limiting a torque of the drive shaft 3a transmitted to the converter mechanism 5, a position detecting mechanism 7 for detecting operating positions of the jaw members 2 and 2, and a housing 1 in which the above members and mechanism are assembled.

The jaw members 2 and 2 have an inverted T-shaped cross section, and slidably fitted into a guide groove 10 formed in the housing 1, and straightly opened and closed along the guide groove 10. The jaw members 2 and 2 grasp a workpiece using attachments 2a and 2a mounted to the jaw members 2 and 2, respectively.

The electric motor 3 includes the speed reducer 4 having a speed reducing mechanism having a plurality of gears, and a rotational speed of a rotor is reduced by the speed reducer 4 and the reduced speed is transmitted to a drive shaft 3a. The drive shaft 3a projects into a recess 11 formed in the housing 1. A cam member 12 which is a constituting part of the converter mechanism 5 is connected to a tip end of the drive shaft 3a through the torque limiter 6.

Figure 3:
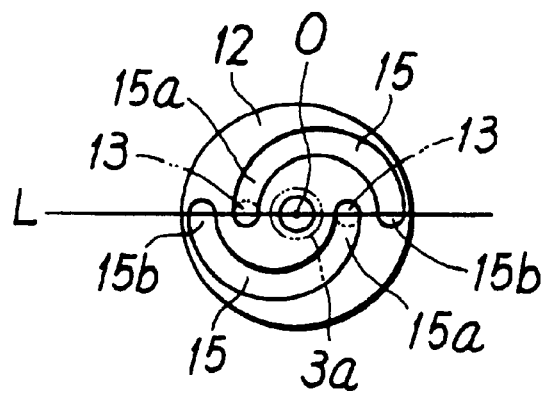
FIG. 3 is a plan view of a cam member.

The cam member 12 has a shallow circular cup-shape. As shown in FIG. 3, a pair of semi-circular cam grooves 15 and 15 are formed in an upper face of the cam member 12 such that the cam grooves 15 and 15 are symmetrical about the center. These cam grooves 15 and 15 are positioned such that opposite ends 15a and 15b of each of the cam grooves 15 and 15 are astride a rotation center O of the cam member 12 on a straight line L passing through the rotation center O, and the one end 15a is located close to the rotation center O, and the other end 15b is located apart from the rotation center O.

Drive pins 13 which are constituting parts of the converter mechanism 5 are fixed to each of the jaw members 2 and 2. The drive pins 13 are fitted into the cam grooves 15 and 15.

If the cam member 12 is rotated leftward through 180 (by the motor 3 from a state shown in FIG. 3 in which the drive pins 13 and 13 are moved toward inner ends 15a and 15a, the straight line L is moved outward of the cam member 12 along the cam grooves 15 and 15 to which the drive pins 13 and 13 move, and the pair of jaw members 2 and 2 are opened. If the cam member 12 is rotated rightward from the open state, the drive pins 13 and 13 are pulled inward in the cam grooves 15 and 15 and are moved toward the rotation center of the cam member 12 and therefore, the jaw members 2 and 2 are closed.

In this manner, the pair of jaw members 2 and 2 are opened and closed by normally or reversely rotating the cam member 12 using the drive shaft 3a of the motor 3, thereby grasping the workpiece between the attachments 2a and 2a respectively mounted to the jaw members 2 and 2 or releasing the grasped workpiece. At that time, when the jaw members 2 and 2 stop at the opening or closing end or the grasping position, an inertial force due to the rotor of the motor 3 is applied to the drive shaft 3a. Thereupon, the torque limiter 6 for absorbing and restricting this inertial force is provided.

Figure 4:
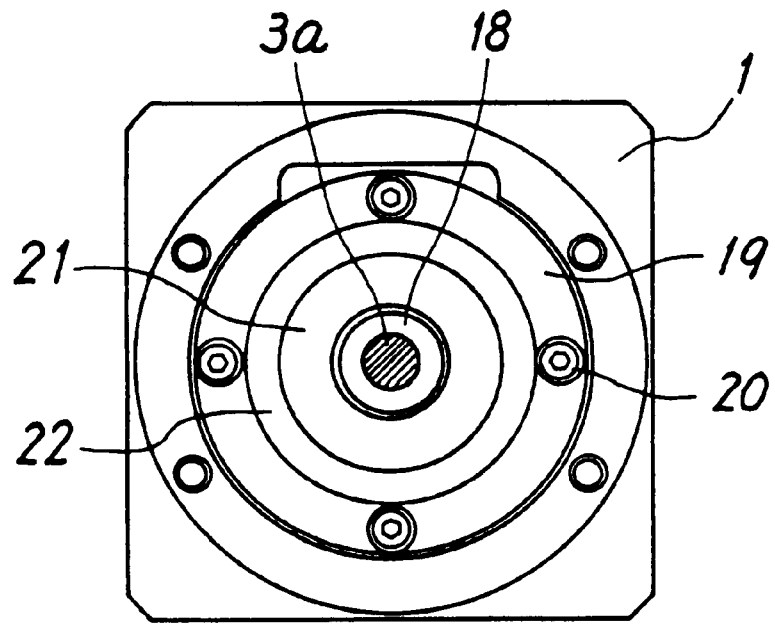
FIG. 4 is a sectional view taken along a line IV-IV in FIG. 1.

The torque limiter 6 has friction means 17 between the drive shaft 3a and the cam member 12, and connects the drive shaft 3a and the cam member 12 with each other using a friction force of the friction means 17. The torque limiter 6 is formed such that if a torque exceeding the friction force is applied to the drive shaft 3a, the drive shaft 3a idles. More specifically, as shown in FIG. 4, the friction means 17 includes a disc-like hub 18 fixed to the drive shaft 3a and coaxially fitted in the cam member 12, and a friction plate 19 of an annular shape fitted to the hub 18. An outer periphery of the friction plate 19 is fixed to an annular mounting face 12a surrounding the hub 18 of the cam member 12 by screws 20. An inner periphery of the friction plate 19 abuts against a lower face of the hub 18 such that the inner periphery can slide on the lower face with friction. When a torque equal to or greater than a given value is applied to the drive shaft 3a, the friction plate 19 and the hub 18 slide on each other. A spring seat 21 is mounted to the drive shaft 3a, a Belleville spring 22 is interposed between the spring seat 21 and the friction plate 19, and the friction plate 19 is pushed toward the hub 18 by a spring force of the Belleville spring 22.

By providing the above-described torque limiter 6 between the drive shaft 3a and the cam member 12, when the jaw members 2 and 2 stop at the opening or closing end or the grasping position of the workpiece, after the cam member 12 stops together with the jaw members 2 and 2, the inertial force caused by the rotor of the motor 3 applied to the drive shaft 3a is absorbed and restrained by sliding motion of the hub 18 and the friction plate 19 with friction, and the motor part such as the gear of the speed reducer 4 is prevented from being damaged by the stop impact. As a result, durability of the hand is remarkably enhanced, the opening and closing speed of the jaw members 2 and 2 is increased, and operational efficiency is also enhanced.

When the jaw members 2 and 2 are opened or closed, since the hub 18 and the friction plate 19 are connected to each other by friction force, the rotation of the drive shaft 3a is reliably transmitted to the cam member 12.

In the illustrated embodiment, the friction plate 19 is fixed to the cam member 12 side, and the friction plate 19 abuts against the hub 18 side, but the friction plate 19 may be fixed to the hub 18 side and the may abut against the cam member 12 side on the contrary.

Figure 5:
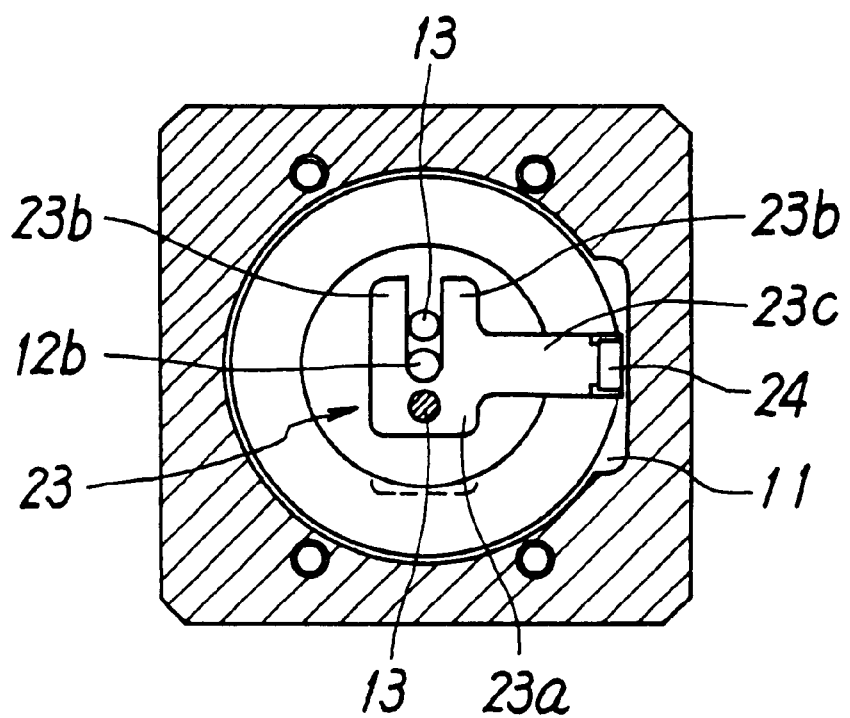
FIG. 5 is a sectional view taken along a line V-V in FIG. 2.

As shown in FIGS. 2 and 5, the position detecting mechanism 7 includes a moving member 23 disposed between the jaw members 2 and 2 and the cam member 12 in a state in which the position detecting mechanism 7 is assembled to the drive pins 13 of one of the jaw members 2 and 2. The moving member 23 includes a base 23a mounted to the drive pins 13, a pair of moving guide portion 23b and 23b extending in parallel to each other from the base 23a to sandwich a projection 12b on the cam member 12, and a mounting portion 23c extending sideway from one of the moving guide portion 23b and provided at its tip end with a to-be-detected body 24. The mounting portion 23c is bent into a substantially L-shape along an inner face of the recess 11 of the housing 1, and the to-be-detected body 24 is mounted to a tip end of the mounting portion 23c. The to-be-detected body 24 is opposed to a mounting groove 26 of a position sensor 25 formed on an outer peripheral face of the housing 1.

The position sensor 25 is formed into a long and thin cylindrical shape, and is inserted into a predetermined position in the mounting groove 26 having a circular cross section, and is fixed by means of screw. The position detecting mechanism 7 is constituted by the position sensor 25 and the to-be-detected body 24 mounted to the moving member 23.

In the illustrated embodiment, the to-be-detected body 24 uses a permanent magnet, and the position sensor 25 uses a magnet-proximity switch which senses proximity of magnet which is the to-be-detected body 24. But the present invention is not limited to such examples, and various modifications can be used. For example, the to-be-detected body 24 may be made of metal, and the position sensor 25 may be a high frequency oscillation type proximity sensor.

As described in detail, according to the electric hand of the present invention, it is possible to absorb by a torque limiter an inertial force applied to a motor drive shaft when the jaw members stop at an opening or closing end or a workpiece-grasping position, thereby preventing a motor part such as a gear from being damaged by the impact.

What is claimed is:

1. An electric hand with a torque limiter comprising:
  a pair of jaw members which can be opened and closed for grasping a workpiece;
  an electric motor having a rotating drive shaft;
  a converter mechanism provided between said drive shaft and said jaw members for converting a normal or reverse rotation motion of said drive shaft into an opening and closing motion of said pair of jaw members, said converter mechanism having a cam member which is normally or reversely rotated by said drive shaft, a pair of cam grooves formed in said cam member, and drive pins respectively mounted to the jaw members and fitted to the pair of cam grooves, said drive pins are displaced in said cam groove by a normal or reverse rotation of said cam member in an opening or closing direction of said jaw members; and a torque limiter provided between said drive shaft of said electric motor and said cam member of the converter mechanism for limiting a torque of said drive shaft transmitted to said cam member.

2. An electric hand according to claim 1, wherein said torque limiter includes friction means for connecting said drive shaft and said cam member by a frictional force.

3. An electric hand according to claim 2, wherein said friction means includes a disc-like hub fixed to said drive shaft, a friction plate fixed to one of said hub and said cam member and abutted against the other in a friction state, and spring means for biasing said friction plate in a direction abutting against said hub or said cam member.

4. An electric hand according to claim 3, wherein said cam member is of circular cup-like shape, said hub is coaxially fitted into said cam member, said friction plate is of an annular shape, an outer periphery of said friction plate is fixed to an annular mounting face of said cam member surrounding said hub, an inner periphery of said friction plate abuts against said hub, said spring means comprises a Belleville spring, said Belleville spring is interposed between a spring seat mounted to said drive shaft and said friction plate.

* * * * *